United States Patent
Lu et al.

(10) Patent No.: US 12,053,804 B2
(45) Date of Patent: *Aug. 6, 2024

(54) ROBOT SCHEDULING METHOD

(71) Applicant: SUZHOU RADIANT PHOTOVOLTAIC TECHNOLOGY CO., LTD, Suzhou (CN)

(72) Inventors: Jianxiang Lu, Suzhou (CN); Zhixiang Wang, Suzhou (CN); Jianrong Xu, Suzhou (CN); Fei Xu, Suzhou (CN)

(73) Assignee: SUZHOU RADIANT PHOTOVOLTAIC TECHNOLOGY CO., LTD, Suzhou (CN)

( * ) Notice: Subject to any disclaimer, the term of this patent is extended or adjusted under 35 U.S.C. 154(b) by 650 days.

This patent is subject to a terminal disclaimer.

(21) Appl. No.: 17/283,159

(22) PCT Filed: Nov. 9, 2019

(86) PCT No.: PCT/CN2019/116914
§ 371 (c)(1),
(2) Date: Apr. 6, 2021

(87) PCT Pub. No.: WO2020/094145
PCT Pub. Date: May 14, 2020

(65) Prior Publication Data
US 2021/0341932 A1    Nov. 4, 2021

(30) Foreign Application Priority Data
Nov. 9, 2018 (CN) .......................... 201811333600.4

(51) Int. Cl.
*B08B 13/00* (2006.01)
*B65G 67/02* (2006.01)
(Continued)

(52) U.S. Cl.
CPC .............. *B08B 13/00* (2013.01); *B65G 67/02* (2013.01); *G01G 19/021* (2013.01);
(Continued)

(58) Field of Classification Search
CPC ...... B08B 13/00; B65G 67/02; G01G 19/021; G05D 1/0225; G05D 1/0217;
(Continued)

(56) References Cited

U.S. PATENT DOCUMENTS

2012/0152877 A1* 6/2012 Tadayon ................. F24S 40/90
901/30
2014/0365258 A1* 12/2014 Vestal .................. G05D 1/0297
901/1
2017/0113354 A1* 4/2017 Dubrovsky .......... G05D 1/0088

FOREIGN PATENT DOCUMENTS

CN 102981468 * 3/2013 ............. Y02P 90/02
CN 105773626 A 7/2016
(Continued)

OTHER PUBLICATIONS

PCT Search Report (with English translation) for International Application No. PCT/CN2019/116914, mailed Feb. 1, 2020, 5 pp.
(Continued)

*Primary Examiner* — Joan T Goodbody
(74) *Attorney, Agent, or Firm* — The Roy Gross Law Firm, LLC; Roy Gross

(57) ABSTRACT

A robot scheduling method. Robots include a cleaning robot for performing cleaning operations in a cleaning region and a conveying robot for transporting the cleaning robot in an aisle region. The robot scheduling method includes a task generating step, a task issuing step, a route planning step, a travel controlling step, and a docking controlling step.

11 Claims, 7 Drawing Sheets

(51) Int. Cl.
*G01G 19/02* (2006.01)
*G05D 1/00* (2006.01)
*H02S 40/10* (2014.01)
*B63H 25/00* (2006.01)
*F24S 40/20* (2018.01)
*G01C 21/20* (2006.01)

(52) U.S. Cl.
CPC ........... *G05D 1/0225* (2013.01); *H02S 40/10* (2014.12); *B63H 25/00* (2013.01); *F24S 40/20* (2018.05); *G01C 21/20* (2013.01); *G05D 1/0217* (2013.01); *Y02E 10/40* (2013.01)

(58) Field of Classification Search
CPC ......... G05D 2201/0203; G05D 1/0297; G05D 1/0291; H02S 40/10; F24S 40/20; G01C 21/20; Y02E 10/40; Y02E 10/50
See application file for complete search history.

(56) References Cited

FOREIGN PATENT DOCUMENTS

| | | | |
|---|---|---|---|
| CN | 107544505 A | 1/2018 | |
| CN | 107544519 A | 1/2018 | |
| CN | 107592069 A | 1/2018 | |
| CN | 207731154 U | 8/2018 | |
| CN | 109560766 A | 4/2019 | |
| JP | 2014211667 | * 11/2014 | ............. G05B 13/02 |
| WO | 2014175803 A1 | 10/2014 | |

OTHER PUBLICATIONS

PCT Written Opinion for International Application No. PCT/CN2019/116914, mailed Feb. 1, 2020, 4 pp.

* cited by examiner

ROBOT SCHEDULING METHOD

CROSS REFERENCE TO RELATED APPLICATIONS

This application is a National Phase of PCT Patent Application No. PCT/CN2019/116914 having International filing date of Nov. 9, 2019, which claims the benefit of priority of Chinese Patent Application No. 201811333600.4, filed Nov. 9, 2018, the contents of which are all incorporated herein by reference in their entirety.

FIELD OF DISCLOSURE

The present disclosure relates to a robot scheduling method used in a solar panel cleaning system.

BACKGROUND

As fossil fuels are declining, solar energy, as a new renewable energy source, has become an important part of human energy use. In the past ten years, solar energy application technology has developed rapidly in all countries in the world.

Since a working environment of solar panels can only be outdoors, the biggest problem affecting their work is not wind, rain, thunder, and lightning, but accumulated dust and snow all year round. Dust or other attachments attached to the solar panels will affect a light transmittance of the panels and decrease a photoelectric efficiency, which will seriously affect the efficiency of the panels to directly obtain sunlight, reduce an energy absorption efficiency and a conversion efficiency of the panel, and reduce a power generation efficiency.

Therefore, every photovoltaic power station needs to clean surfaces of the solar panels. Apparently, manual cleaning is inefficient and risky. Correspondingly, an industry has developed a solar panel cleaning robot to clean the surfaces, which can effectively improve a cleaning efficiency and avoid hidden dangers of personal safety caused by high-level cleaning operations.

SUMMARY OF DISCLOSURE

Since an arrangement of solar panels or panel arrays is not a one-piece installation, but is installed in multiple places in a certain region, there are large space intervals between the solar panels or the panel arrays in different positions in the region. Cleaning robots cannot directly cross these space intervals to different solar panels. If one cleaning robot is installed on each solar panel, not only a hardware cost is too high, but also a use efficiency of each cleaning robot is too low, which will result in a large waste of resources.

One purpose of the present disclosure is to provide a robot scheduling method used in a solar panel cleaning system to solve the technical problem of transferring and scheduling cleaning robots among a plurality of solar panel arrays.

In order to achieve the above purpose, the present disclosure provides a robot scheduling method. Robots includes a cleaning robot and a conveying robot. The cleaning robot is configured to perform cleaning operations in a cleaning region. The conveying robot is configured to transport the cleaning robot in an aisle region. The robot scheduling method includes following steps: a task generating step for generating a conveying task instruction; a task issuing step for issuing the conveying task instruction to the conveying robot; a route planning step for planning an optimization route of the conveying robot; a travel controlling step for controlling the conveying robot to travel along the optimization route; and a docking controlling step for controlling the conveying robot to dock with the cleaning region.

Furthermore, before performing the task generating step, the method further includes following steps: an operation region information acquiring step for acquiring operation region information, where an operation region includes a plurality of cleaning regions and the aisle region between two or more cleaning regions, the operation region information includes an operation region map and a location and a size of each of the cleaning regions in the operation region; a task information acquiring step for acquiring operation task information, where the operation task information includes a location, a size, and a workable time of the cleaning region that needs to be cleaned; and a robot number calculating step for calculating a number of cleaning robots and conveying robots that need to be scheduled.

Furthermore, the robot number calculating step includes following steps: a cleaning robot speed acquiring step for acquiring a travel speed of each of the cleaning robots; a total area calculating step for calculating a total area that needs to be cleaned according to the size of the cleaning region that needs to be cleaned; a total operating hours calculating step for calculating total operating hours required for the cleaning robots to complete all cleaning tasks according to the total area of the cleaning region that needs to be cleaned and the travel speed of each of the cleaning robots; and a cleaning robot number calculating step for calculating the number of the cleaning robots that need to be scheduled according to the total operating hours and the workable time.

Furthermore, the robot number calculating step includes following steps: a conveying robot speed acquiring step for acquiring a travel speed of each of the conveying robots; a first docking region location acquiring step for acquiring a location of a first docking region of the cleaning region that needs to be cleaned according to the operation region map and the location and the size of the cleaning region that needs to be cleaned; a total distance calculating step for calculating a total distance that all conveying robots need to travel according to initial storage locations of all conveying robots and the location of the first docking region of the cleaning region that needs to be cleaned; a conveying robot number calculating step for calculating the number of the conveying robots that need to be scheduled according to the total distance and the travel speed of each of the conveying robots.

Furthermore, the cleaning region is a solar panel or a solar panel array; and/or the cleaning region includes a first docking region and a second docking region. The first docking region is a region outside the cleaning region and adjacent to one side of the cleaning region. The second docking region is a region inside the cleaning region and adjacent to one side of the cleaning region, and is opposite to the first docking region.

Furthermore, before performing the task generating step, the method further includes following steps: a conveying robot monitoring step for acquiring a location and a load status of each conveying robot in real time, where the load status includes a fully loaded state and an unloaded state; a cleaning robot monitoring step for acquiring a real-time operation progress of each cleaning robot in real time; and a conveying robot searching step for searching for one conveying robot that is closest to a first docking region of the cleaning region and is in the unloaded state when an operation progress of one cleaning robot in one cleaning region exceeds a preset threshold.

Furthermore, the conveying robot monitoring step includes following steps: an aisle region setting step for setting two or more aisle regions to form an aisle network for at least one robot to travel; a locating point setting step for evenly setting at least one locating point in the aisle network; a tag setting step for setting at least one readable tag at each locating point, where the readable tag stores locating point information including a location and a serial number of the locating point where the readable tag is located; a tag reading step for reading and outputting the locating point information of the readable tag by one conveying robot; and a locating point information acquiring step for acquiring the locating point information of the readable tag output by the conveying robot to obtain the location and the serial number of the locating point where the conveying robot is located.

Furthermore, the cleaning robot monitoring step includes following steps: a sensor setting step for setting a weight sensor or a distance sensor on a conveying device of each conveying robot; a sensor data reading step for reading a sensing data of the weight sensor or the distance sensor of one conveying robot; and a load status determining step for determining whether the conveying robot is loaded with the cleaning robot or not according to the sensing data of the weight sensor or the distance sensor, where if so, the load status of the conveying robot is in the fully loaded state; if not, the load status of the conveying robot is in the unloaded state.

Furthermore, the conveying robot searching step includes following steps: a shortest travel distance calculating step for calculating a shortest travel distance between each conveying robot in the unloaded state and the first docking region of the cleaning region; a shortest travel distance comparing step for comparing the shortest travel distance of each conveying robot in the unloaded state and the first docking region of the cleaning region; and a conveying robot selecting step for selecting the conveying robot with a smallest shortest travel distance and in the unloaded state. The shortest travel distance is a distance corresponding to a shortest route of the conveying robot traveling in the aisle region to the first docking region of the cleaning region.

Furthermore, the conveying task instruction includes: starting point information including a location of a starting point in a conveying task, where when one conveying robot acquires the conveying task instruction, a real-time location of the conveying robot is set to be the starting point; stop-by point information including a position of a stop-by point in the conveying task, where when the cleaning robot is located in a storage region, the stop-by point is located in the storage region; and when the cleaning robot is located on an upper surface of one cleaning region where the cleaning operations have been performed, the stop-by point is located in a first docking region of the cleaning region; and terminal point information including a position of a terminal point in the conveying task. The terminal point is located in a first docking region of a cleaning region that needs to be cleaned.

Furthermore, the route planning step includes: a route deducing step for deducing at least one passable route in at least one aisle region according to the positions of the starting point and the terminal point, where the passable route passes through the stop-by point; a route comparing step for comparing lengths of passable routes when there are two or more passable routes; and an optimization route determining step for determining the passable route as the optimization route if there is only one passable route, or for determining a shortest passable route as the optimization route if there are two or more passable routes.

Furthermore, the docking controlling step includes following steps: an approaching cleaning region step for controlling the conveying robot to travel to a first docking region of one cleaning region, where the conveying robot includes a docking platform and a bridge board; a docking platform initial adjusting step for controlling the conveying robot to adjust a height and/or an angle of the docking platform, so that an upper surface of the docking platform is flush with an upper surface of the cleaning region, where an entrance of the conveying device faces a second docking region; a docking step for controlling the conveying robot to extend the bridge board to dock with the upper surface of the docking platform with the upper surface of the cleaning region; and a cleaning robot transferring step for controlling the cleaning robot to travel from the docking platform to the upper surface of the cleaning region, or from the cleaning region to the upper surface of the docking platform of the cleaning region.

Furthermore, the docking controlling step includes following steps: an undocking step for controlling the conveying robot to retract the bridge board so that the upper surface of the docking platform is separated from the upper surface of the cleaning region; a docking platform readjusting step for controlling the conveying robot to adjust the height and/or the angle of the docking platform, so that the docking platform is moved to a lowest point and keeps in a horizontal level; and a conveying robot leaving step for controlling the conveying robot to leave the cleaning region.

In comparison with prior art, advantages of the present disclosure are as follow. The robot scheduling method used in the solar panel cleaning system is provided. According to a workload of the cleaning operations, an appropriate number of cleaning robots and conveying robots are scheduled. The cleaning robot is configured to complete the cleaning operations on the solar panels or the solar panel arrays. The conveying robot is configured to transfer the cleaning robot among the plurality of solar panel arrays. Therefore, cleaning tasks of all solar panels and panel arrays can be completed in the shortest time.

BRIEF DESCRIPTION OF DRAWINGS

In order to more clearly describe the technical solutions in the embodiments of the present disclosure, the following will briefly introduce the drawings that need to be used in the description of the embodiments. Apparently, the drawings in the following description are only some embodiments of the present disclosure. For those skilled in the art, other drawings can be obtained based on these drawings without creative efforts.

Figure 1:
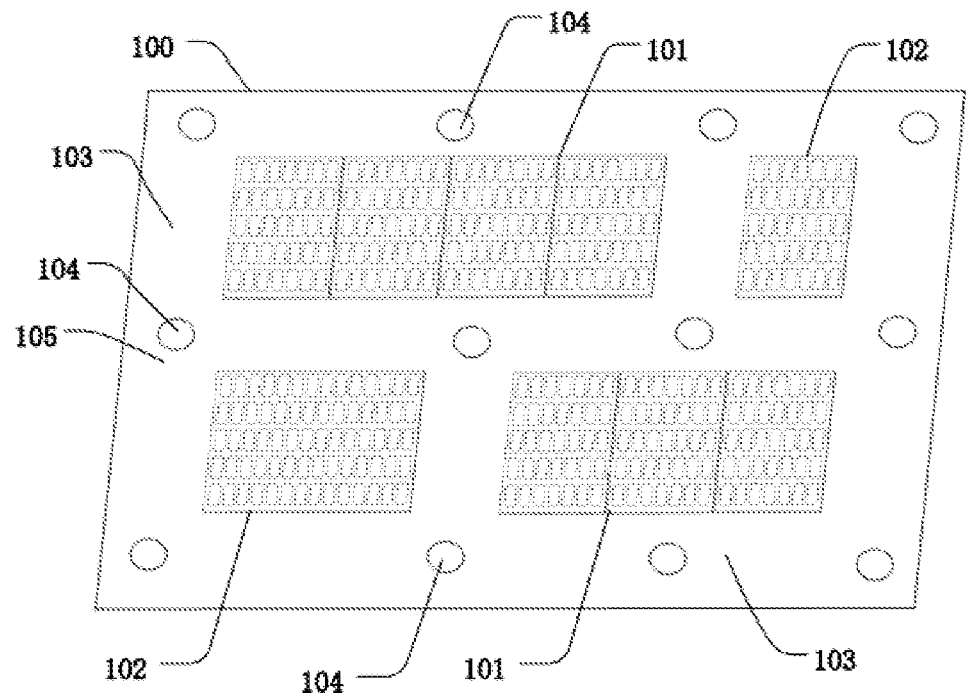
FIG. 1 is a schematic diagram of an operation region of an embodiment of the present disclosure.

Reference numerals in the drawings are as follow.

100 operation region, 200 cleaning robot, 300 conveying robot, 400 data processing system, 500 cleaning region;

101 solar panel array, 102 solar panel, 103 aisle region, 104 locating point, 105 road junction; 201 first wireless communication unit, 301 second wireless communication unit, 401 third wireless communication unit;

310 car body, 320 conveying device, 330 angle adjustment device, 340 processor, 350 height adjustment device;

360 traveling device, 370 travel controlling device;

321 docking platform, 322 baffle, 322a left baffle, 322b rear baffle, 322c right baffle, 323 entrance;

324 anti-collision part, 327 bridge board, 328 first telescopic rod, 329 first telescopic rod controller;

501 cleaning region upper end, 502 cleaning region lower end, 503 cleaning region left side, 504 cleaning region right side;

505 first docking region, 506 second docking region;

601 through-beam sensor, 601a transmitting terminal, 601b receiving terminal; 602 distance sensor, 603 tilt sensor,

604 locating device, 605 electronic compass; 606 image sensor, 607 lighting device, 608 obstacle avoidance sensor.

DETAILED DESCRIPTION

The following describes the preferred embodiments of the present disclosure with reference to the drawings of the specification to illustrate that the present disclosure can be implemented. These embodiments can completely introduce the technical content of the present disclosure to those skilled in the art, so that the technical content of the present disclosure is clearer and easier to understand. However, the present disclosure can be implemented in many different forms of embodiments. The protection scope of the present disclosure is not limited to these embodiments mentioned in the text.

In the drawings, components with the same structure are denoted by the same numerals. Components with similar structures or functions are represented by similar numerals. When one component is described as being "connected to" another component, these two can be understood as being directly "connected", or one component is "connected" to another component through an intermediate component.

As shown in FIG. 1, an operation region 100 is provided in a solar power station. A plurality of solar panel arrays 101 are included in the operation region. A tilt angle of each solar panel array 101 to the horizontal plane is a certain angle value from 15 to 45 degrees, in order to ensure as much direct sunlight as possible irradiated to solar panels. In most solar power stations, the tilt angle relative to the horizontal plane (referred to as panel tilt angle or tilt angle) of all solar panels is the same. In some solar power stations, tilt angles of different solar panels may be different, and even the tilt angles of some panels are adjustable or changeable.

As shown in FIG. 1, each solar panel array 101 includes a plurality of solar panels 102 (referred to as panels) that are spliced together. The plurality of solar panel arrays 101 and/or the plurality of solar panels 102 may be arranged in a matrix. An aisle region 103 is formed between any two adjacent solar panel arrays 101 or solar panels 102. In this embodiment, a plurality of aisle regions 103 that are cross-connected to each other form a criss-crossed aisle network.

Figure 2:
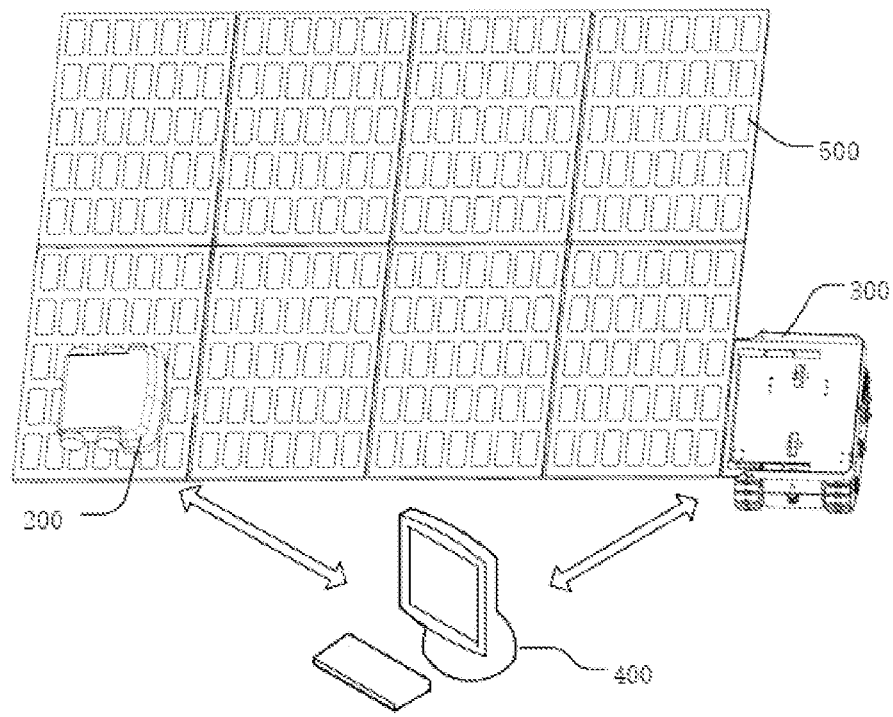
FIG. 2 is a schematic diagram showing an operating state of a cleaning system of the embodiment of the present disclosure.
Figure 3:
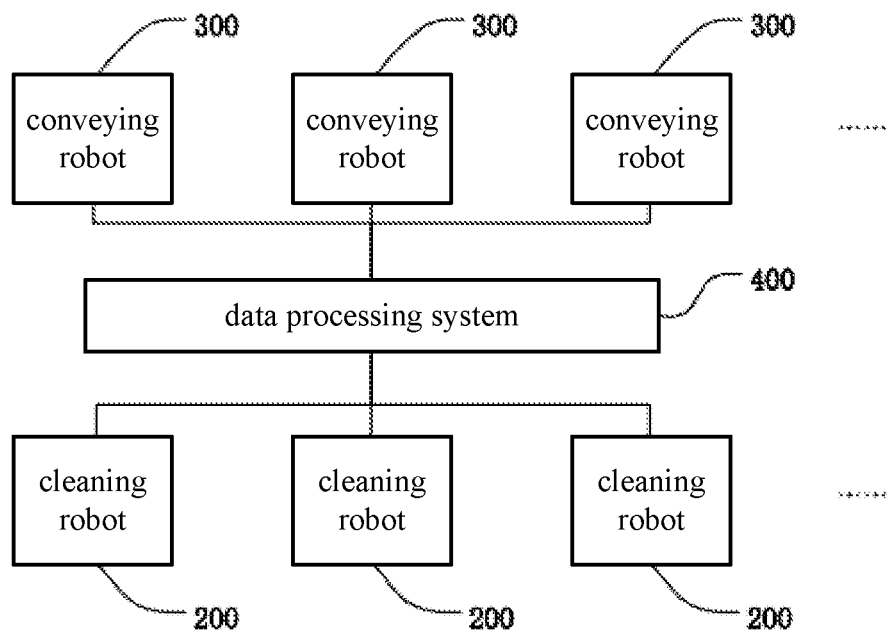
FIG. 3 is a schematic diagram of the cleaning system of the embodiment of the present disclosure.

As shown in FIG. 2 to FIG. 3, the embodiment provides a cleaning system, including a cleaning robot 200, a conveying robot 300, and a data processing system 400. An operation region 100 is a working region where the cleaning robot 200 and the conveying robot 300 perform cleaning operations of solar panels.

During a normal operation of the solar power station, some solar panels or solar panel arrays will be stained with dust or stains and need to be cleaned. Each solar panel or solar panel array that needs to be cleaned is a cleaning region 500. The cleaning robot 100 can complete cleaning operations on the solar panel or solar panel array, so it can effectively clean every area on the panel or panel array. The conveying robot 300 can transfer the cleaning robot 200 from a storage place of the cleaning robot to an upper surface of the cleaning region 500 (a panel or a panel array that needs to be cleaned), from the upper surface of a cleaned panel array to an upper surface of another cleaning region 500 (a panel or a panel array that needs to be cleaned), or from the upper surface of the cleaned cleaning region 500 to the storage place of the cleaning robot.

Figure 4:
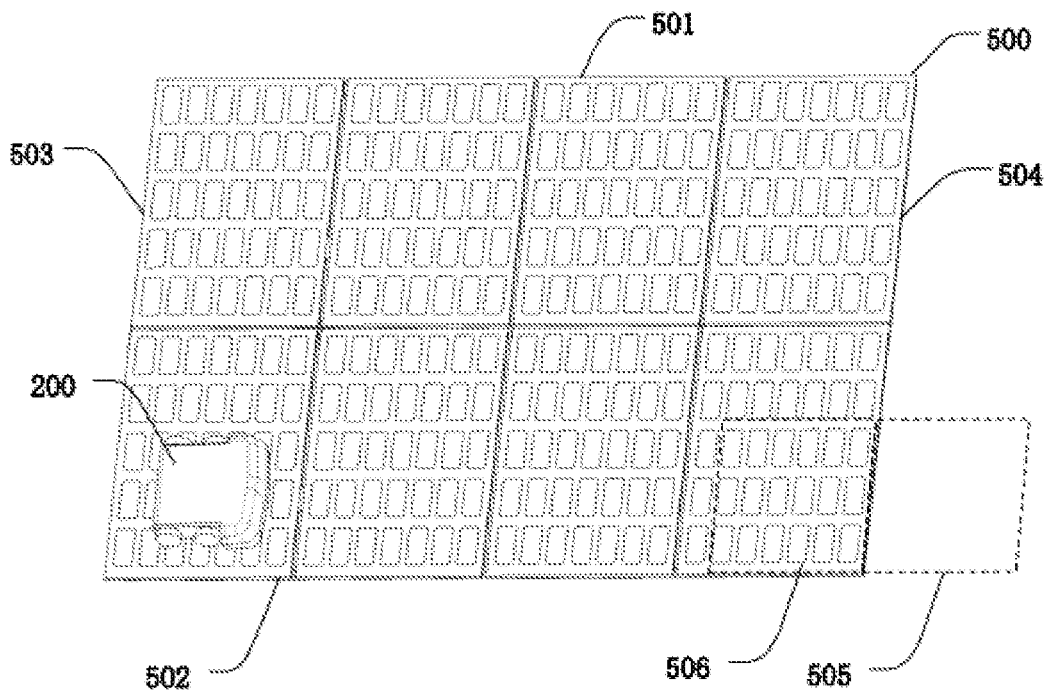
FIG. 4 is a schematic diagram a cleaning region of the embodiment of the present disclosure.

As shown in FIG. 4, preferably, each cleaning region 500 is a panel array which is combined into a rectangle, and its peripheral edges are respectively defined as a cleaning region upper end 501, a cleaning region lower end 502, a cleaning region left side 503, and a cleaning region right side 504.

When a cleaning robot 200 is carried by a conveying robot 300 to a cleaning region 500, preferably, the cleaning robot 200 travels from the cleaning region left side 503 or the cleaning region right side 504 to the cleaning region 500. Similarly, when a cleaning robot 200 is transferred from a cleaning region 500 by a conveying robot 300, preferably, the cleaning robot 200 travels from the cleaning region left side 503 or the cleaning region right side 504 to the conveying robot 300.

As shown in FIG. 4, each cleaning region 500 includes a first docking region 505 and a second docking region 506 arranged opposite to each other. The first docking region 505 and the second docking region 506 are respectively disposed on both sides of the cleaning region left side 503 or both sides of the cleaning region right side 504. In this embodiment, the first docking region 505 is a region outside the cleaning region 500 and adjacent to the cleaning region right side 504. The second docking region 506 is a region inside the cleaning region 500 and adjacent to the cleaning region right side 504. Preferably, the first docking region 505 and the second docking region 506 are adjacent to a lower part of the cleaning region right side 504.

To determine whether the solar panel array in the photovoltaic power station needs to be cleaned or not, there are several common solutions as follows. A first solution is a partition estimation method. Natural environment of a plurality of panel arrays adjacent to each other in a small region (the region can be freely defined) is similar. Therefore, a pollution degree of the panels in this region is similar. By randomly selecting one solar panel to detect its pollution degree, it can be determined whether this panel needs to be cleaned or not. If the panel needs to be cleaned, all the panels in this region need to be cleaned. If an operation region of a power station covers a large area, a large-scale operation region can be divided into a plurality of small-scale operation regions, and the divided regions can be sampled and tested. A second solution is a regular cleaning method. According to the natural environment of the operation region, all the panel arrays in the operation region are cleaned regularly. If the operation region is subjected to heavy sandstorms or heavy rainfall, the solar panels have heavy attachments, so it may need to be cleaned 1 to 2 times per day. If the operation region is subjected to less sandstorms or less rainfall, the solar panels have less attachments, so it can be cleaned every 10 days. The above two methods are indiscriminate processing of the plurality of solar panel arrays, and accuracy is relatively poor. There may be a situation where some panels have less surface attachments and are cleaned by the cleaning robot. A third solution is a separate detection method. By carefully detecting the pollution degree of each panel array to determine which panel arrays or panels need to be cleaned. This method is more accurate, but less efficient.

As shown in FIG. 3, a data processing system 400, preferably a physical server or a cloud server, is connected to cleaning robots 200 and/or conveying robots 300 to realize data exchange between the cleaning robots 200 and/or the conveying robots 300. The data processing system 400 issues control instructions to the cleaning robots 200 and/or the conveying robots 300, and acquires feedback data from the cleaning robots 200 and/or the conveying robots 300. For example, real-time location coordinates of the above two robots and image data collected by the two robots in real time. Thus, the data processing system 400 can realize a real-time monitoring of the cleaning operations of the cleaning robots 200 and traveling and docking of the conveying robots 300, control the conveying robots 300 to move normally in the aisle network of the operation region 200, and control the docking of the conveying robot 300 with the solar panel array 101 of the cleaning region.

After the data processing system 400 obtains information (serial numbers of some panels) about which solar panel arrays 101 need to be cleaned, by combining a time allowed for cleaning operations in the photovoltaic power station, it estimates the number of conveying robots 300 and cleaning robots 200 required for the cleaning operations. The data processing system 300 dispatches a conveying robot 300 to transfer a cleaning robot 200 to a panel array that needs to be cleaned. The cleaning robot 200 performs comprehensive cleaning operations on the panel array. After the cleaning operations of the panel array are completed, the data processing system 400 dispatches the conveying robot 300 to carry the cleaning robot 200 from an upper surface of the panel array that has been cleaned to an upper surface of another panel array that needs to be cleaned, or to the storage place of the cleaning robot.

The cleaning robot 200 is a product independently developed by the applicant. Please refer to a series of related patents on solar panel cleaning robots filed by the applicant from 2016 to 2018. After the cleaning robot 200 is transferred to the solar panel array, it can travel freely on the panel array, and walk around every corner of the panel array. The cleaning operations of the entire panel array are completed while on the move, so it will not be repeated here.

Figure 5:
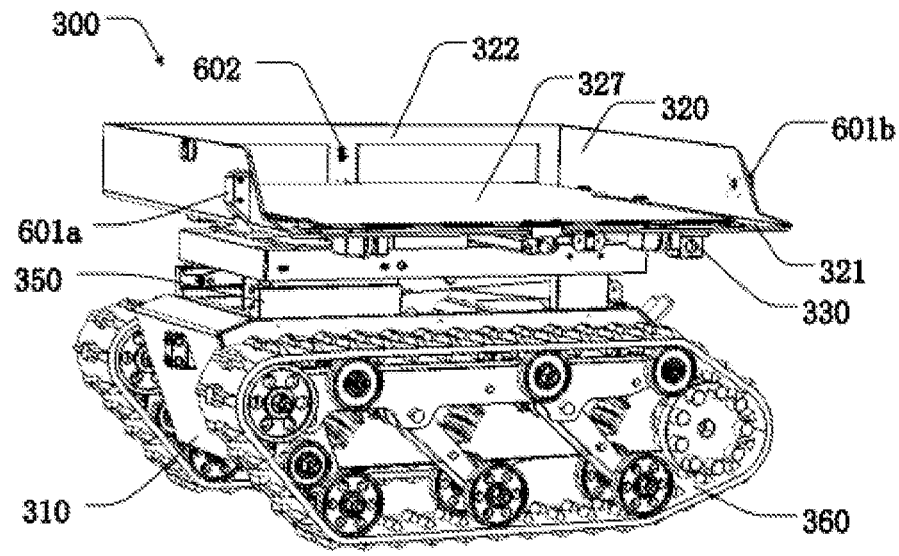
FIG. 5 is a schematic diagram of a conveying robot showing a docking platform in a horizontal state of the embodiment of the present disclosure.

As shown in FIG. 5, this embodiment provides a conveying robot 300, which includes a car body 310, a conveying device 320, an angle adjustment device 330, a height adjustment device 350, a traveling device 360, and a travel controlling device 370.

Figure 6:
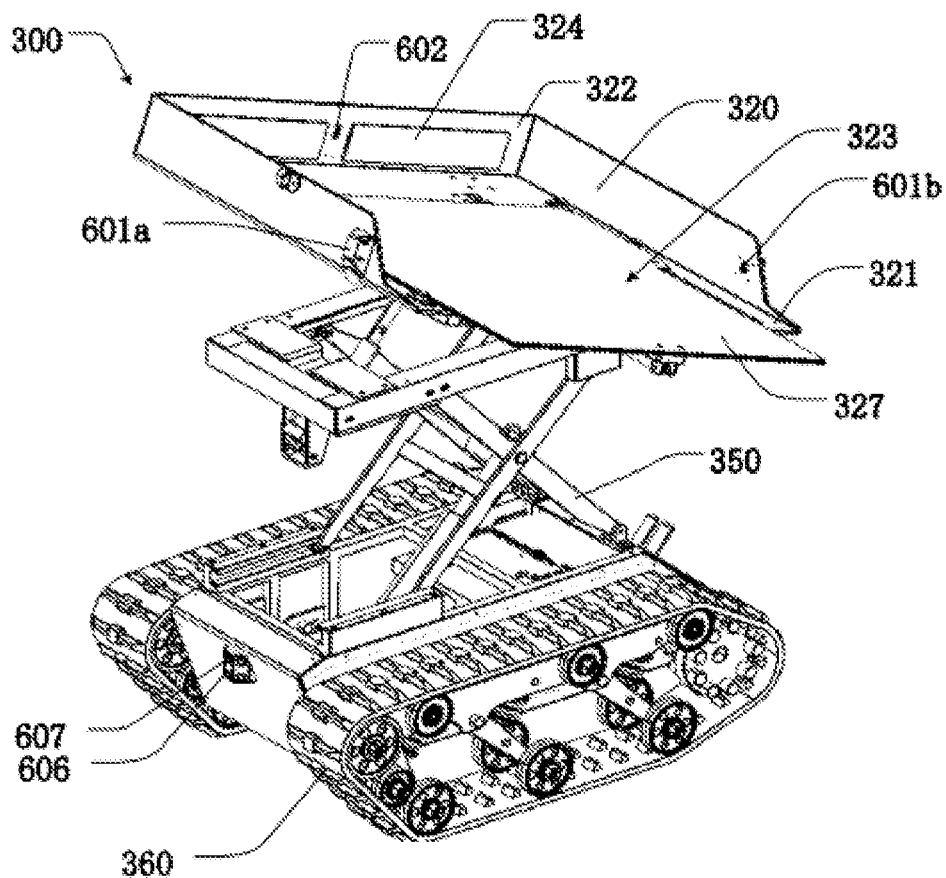
FIG. 6 is a schematic diagram of the conveying robot showing the docking platform in a tilted state of the embodiment of the present disclosure.

As shown in FIG. 5 and FIG. 6, the conveying device 320 includes a docking platform 321 configured to place the cleaning robot 200. The docking platform 321 can be rotatably connected to a top or an upper half part of the car body 310. The angle adjustment device 330 is configured to adjust a tilt angle of the docking platform 321. The height adjustment device 350 is configured to adjust a height of the docking platform 321. The traveling device 360 is a wheel or a crawler. The travel controlling device 370 is configured to issue control instructions to control a movement of the car body and adjust a position of the car body.

Figure 7:
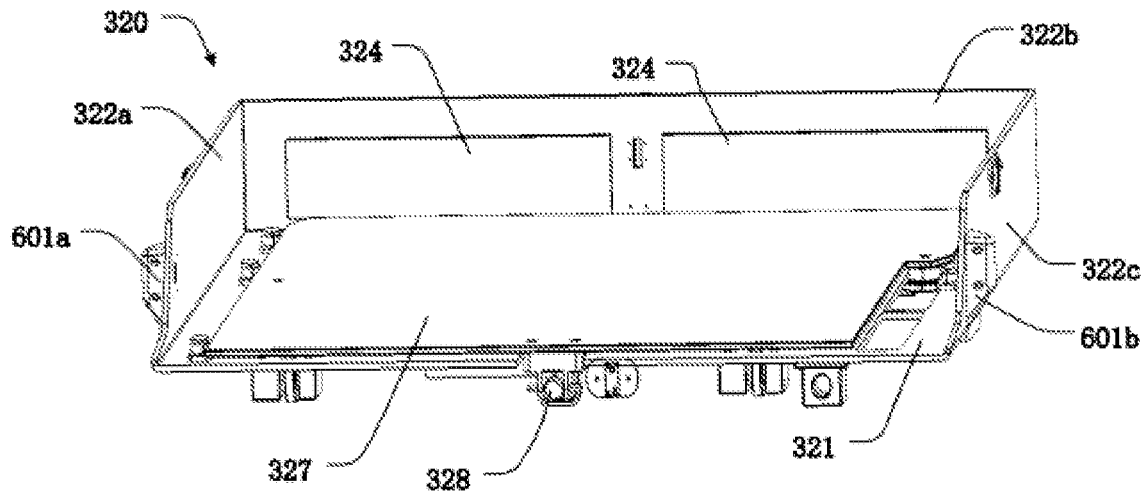
FIG. 7 is a schematic diagram of a top of the conveying robot of the embodiment of the present disclosure.

As shown in FIG. 5 to FIG. 7, the conveying device 320 includes a baffle 322 which protrudes from an edge of the docking platform 321 and is perpendicular to the docking platform 321. The baffle 322 includes a left baffle 322*a*, a rear baffle 322*b*, and a right baffle 322*c* that are connected in sequence and are enclosed in a concave shape. An entrance 323 is formed between an open end of the left baffle 322*a* and an open end of the right baffle 322*c*.

The conveying device 320 also includes an anti-collision part 324, preferably an anti-collision strip, arranged on an inner wall of the rear baffle 322*b*. Alternatively, an inner wall of the left baffle 322*a* and/or the right baffle 322*c* can also be provided with an anti-collision strip (not shown in the drawings).

The conveying device 320 also includes a bridge board 327 and a first telescopic rod 328. The bridge board 327 can be slidably installed on the upper surface of the docking platform 321. One end of the first telescopic rod 328 is connected to a lower surface of the docking platform 321, and the other end of that is connected to a lower surface of the bridge board 327. The first telescopic rod 328 is a hydraulic telescopic rod or an electric telescopic rod. The first telescopic rod 328 includes a first telescopic rod controller 329. When the first telescopic rod controller 329 receives a command electrical signal, it can control the first telescopic rod 328 to adjust its length. When the length of the first telescopic rod 328 is minimized, the bridge board 327 is located on the upper surface of the docking platform 321. When the length of the first telescopic rod 328 is elongated, the bridge board 327 extends in a direction of the entrance 323 for a certain distance. When a distance between the conveying robot 300 and the solar panel array 101 is minimized and the angle of the docking platform 321 is adjusted to be consistent with that of the solar panel array 101, the first telescopic rod 328 extends a certain distance. The bridge board 327 extends to the solar panel array 101, so that the docking platform 321 is docked with the solar panel array 101. Thus, the cleaning robot 200 can move smoothly from the docking platform 321 to the solar panel array 101 (i.e., the cleaning region), or from the solar panel array 101 (i.e., the cleaning region) to the docking platform 321. After the cleaning robot 200 is transferred, the length of the first telescopic rod 328 is reduced to the shortest. The bridge board 327 is retracted to the upper surface of the docking platform 321.

When the tilt angle and the height of the docking platform 321 are adjusted, the data processing system 400 receives feedback information from the conveying robot 300, and then sends action instructions to the cleaning robot 200 to control the cleaning robot 200 to travel from the docking platform 321 of the first docking region 505 to the solar panel of the second docking region 506 (referred to as an upper board), or to travel from the solar panel of the second docking region 506 to the docking platform 321 of the first docking region 505 (referred to as a lower board), thereby completing a docking process.

Figure 13:
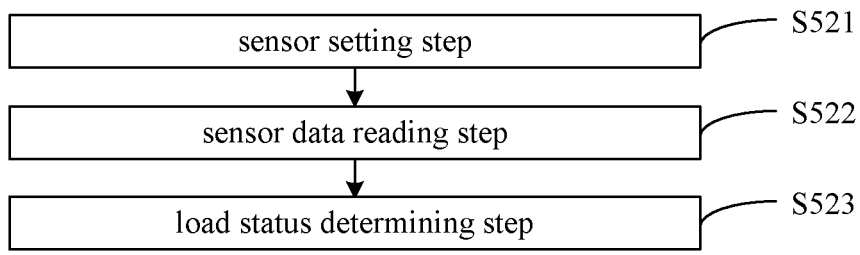
FIG. 13 is a flowchart of another part of the conveying robot monitoring step of the embodiment of the present disclosure.

The conveying robot 300 in this embodiment further includes a circuit board (not shown in the drawings), which is disposed in the car body 310. As shown in FIG. 13, the circuit board includes a processor 340 serving as a control device of the conveying robot 300.

As shown in FIG. 13, the cleaning robot 200 includes a first wireless communication unit 201. The conveying robot 300 includes a second wireless communication unit 301. The data processing system 400 includes a third wireless communication unit 401. The first wireless communication unit 201, the second wireless communication unit 301, and the third wireless communication unit 401 are wirelessly connected to each other, so that the cleaning robot 200 or the conveying robot 300 and the data processing system 400 can exchange data in a wireless communication manner.

As shown in FIG. 4, when the conveying robot 300 travels near the cleaning region 500 (the solar panel or the panel array), the data processing system 400 controls the conveying robot 300 to adjust its position and direction so as to travel to the first docking region 505 at a lower right side of the cleaning region 500. Also, the entrance 323 of the conveying device 320 faces the cleaning region 500.

In this embodiment, when the conveying robot 300 is traveling in the aisle region 103, the docking platform 321 is horizontally arranged on a top of the car body 310. An included angle between the docking platform 321 and an upper surface of the car body 310 is 0 degrees. If the cleaning robot 200 is placed on the docking platform 321, it can remain stable during transportation without slipping off.

In this embodiment, when the docking platform 321 is in an inclined state, a height of the lowest part of the docking platform 321 is greater than or equal to the lowest end (such as the cleaning region lower end 502) of the solar panel or the panel array in the operation region 100. A height of the highest point of the docking platform 321 is less than or equal to the highest end (such as the cleaning region upper end 501) of the solar panel or the panel array in the operation region 100. It is ensured that during the docking process, the docking platform 321 can be fully docked with the left or right side (such as the cleaning region left side 503 or the right side 504) of the solar panel or the panel array.

Regardless of whether the docking platform 321 is in the inclined state or a horizontal state, the height of the lowest part of the docking platform 321 is approximately unchanged. The height basically depends on a height of the top of the car body 310. Preferably, a docking position of the docking platform 321 and the panel is located at a lower part of the right side of the panel or the panel array, so that a height requirement of the car body 310 is relatively low. The lower the center of gravity of the car body 310 is, the more stable the conveying robot 300 will be in the process of carrying the cleaning robot to travel, thereby effectively preventing bumps and shaking caused by uneven road surfaces.

Figure 8:
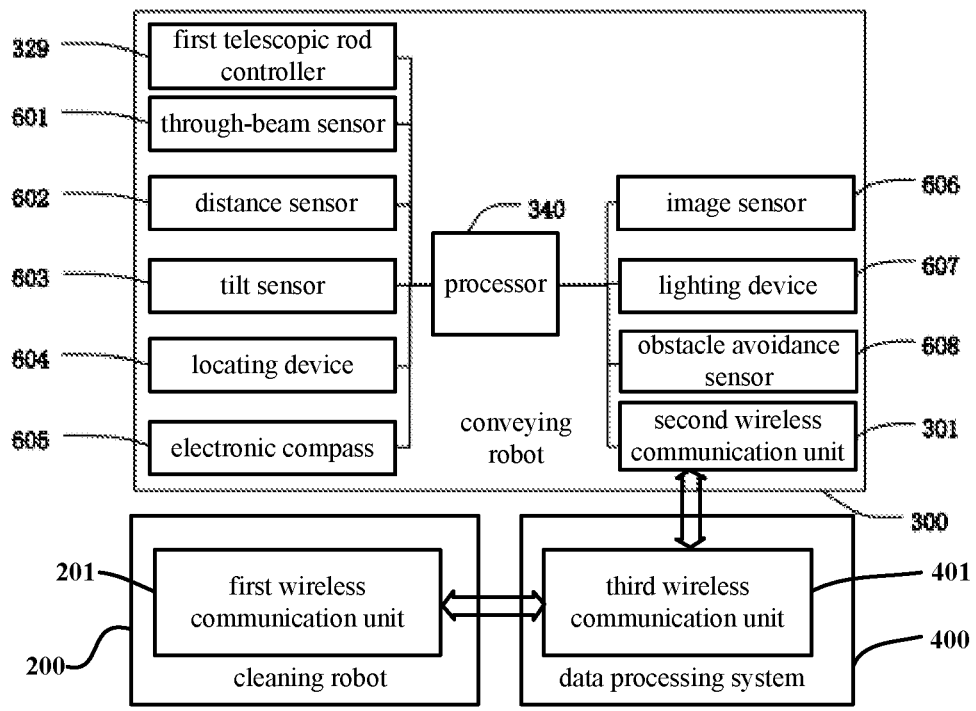
FIG. 8 is a schematic diagram of functional modules of an electronic device of the cleaning system of the embodiment of the present disclosure.

As shown in FIG. 8, in this embodiment, the conveying robot 300 also includes a variety of data collection devices for collecting various work data in the working process of the conveying robot 300. The data collection device includes different types of sensors, including a through-beam sensor 601, a distance sensor 602, a tilt sensor 603, a locating device 604, an electronic compass 605, an image sensor 606, a lighting device 607, an obstacle avoidance sensor 608, and so on. These aforementioned sensors are connected to the processor 340 in a wired or wireless manner. Original work data collected by the conveying robot 300 during the operations is transmitted to the processor 340, and then processed by the processor 340 to form pre-processed data. The original working data and/or the pre-processed data are sent to the data processing system 400 through the wireless communication unit to realize real-time monitoring of the working process of the conveying robot 300 and real-time controlling of the traveling process and/or docking process of the conveying robot 300.

As shown in FIG. 5 to FIG. 7, the through-beam sensor 601 includes a transmitting terminal 601a and a receiving terminal 601b disposed oppositely, which are respectively disposed on an inner wall of the left baffle 322a and an inner wall of the right baffle 322c of the conveying device 320. The transmitting terminal 601a and the receiving terminal 601b are close to the entrance 323, and are respectively arranged on both sides of the entrance 323. The through-beam sensor 601 is preferably a pair of through-beam infrared sensors. Infrared rays emitted by the transmitting terminal 601a are acquired by the receiving terminal 601b. When the infrared rays are blocked, the processor 340 can determine that there is an item passing through the entrance 323.

When a cleaning robot 200 travels from an outside through the entrance of the conveying device 320, the infrared rays between the transmitting terminal 601a and the receiving terminal 601b are blocked. The through-beam sensor 601 can sense that a front end of the cleaning robot 200 travels to the conveying device 320. When the entire cleaning robot 200 completely travels to an inside of the conveying device 320, the infrared rays between the transmitting terminal 601a and the receiving terminal 601b return to an unobstructed state. The through-beam sensor 601 can sense that a rear end of the cleaning robot 200 also travels into the conveying device 320. Based on real-time electrical signals of the through-beam sensor 601, the processor 340 can determine that the front end of a cleaning robot 200 travels to the conveying device 320, or it can determine that the entire cleaning robot 200 travels into the conveying device 320.

The distance sensor 602 is disposed on an inner wall of a middle of the rear baffle 322b of the conveying device 320, and is arranged opposite to the entrance 323. The distance sensor 602 is preferably a reflective infrared sensor. The reflective infrared sensor continuously emits infrared rays in a direction of entrance 323. If the reflected infrared rays can be received, it can be determined that the cleaning robot 200 enters the docking platform 321 through the entrance 323. Furthermore, a distance between the front end of the cleaning robot 200 and the rear baffle 322b of the conveying device 320 can be obtained according to times when the infrared rays are received.

When the cleaning robot 200 passes through the entrance of the conveying device 320 from the outside, the distance sensor 602 (reflective infrared sensor) can determine that the cleaning robot 200 travels to the conveying device 320. In addition, the distance between the front end of the cleaning robot 200 and the rear baffle 322b can be determined based on the times when the reflected infrared rays are received. The processor 340 obtains a value of the distance, and can monitor a progress of the cleaning robot 200 entering the conveying device 320 in real time to determine whether the entire cleaning robot 200 is traveling into the docking platform 321.

When the cleaning robot 200 passes through the entrance and leaves the conveying device 320, the distance sensor 602 (reflective infrared sensor) can determine that the cleaning robot 200 has left the conveying device 320. In addition, the distance between the front end of the cleaning robot 200 and the rear baffle 322b can be determined based on the times when the reflected infrared rays are received. The processor 340 obtains the value of the distance, and can monitor a progress of the cleaning robot 200 leaving the conveying device 320 in real time to determine whether the entire cleaning robot 200 leaves the docking platform 321.

The tilt sensor 603 is preferably disposed on the lower surface of the docking platform 321 (see FIG. 8) to measure an included angle (referred to as a platform tilt angle) between the upper surface of the docking platform 321 and the horizontal plane in real time, and to transmit an angle value of the platform tilt angle to the processor 340. If the tilt angles of all solar panels in the operation region 100 are different or the tilt angles of some panels are variable, each time a second telescopic rod 332 is extended, the tilt sensor 603 can monitor the tilt angle of the platform in real time and send it to the processor 340. When the angle value of the real-time platform tilt angle is the same as an angle value of the panel tilt angle, the processor 340 sends a stop command to a second telescopic rod controller 335, so that the second telescopic rod 332 stops extending, and the platform tilt angle is the same as the panel tilt angle.

In this embodiment, the locating device 604 is an RFID reader, which is disposed inside or outside the car body 310, preferably at a bottom of the car body 310 or the front end of the docking platform 321. The locating device 604 is configured to obtain a real-time location of the car body 310 in the operation region, and to transmit the real-time location of the car body 310 to the processor 340.

In this embodiment, a label positioning solution is adopted, and a recommended route is preset in the aisle region 103 to control the car body 310 to travel along the recommended route. A set of identifiable tags, such as RFID tags, are arranged at regular intervals on the recommended route. Each identifiable tag stores data such as a position coordinate of the tag in the operation region. When the conveying robot 300 travels to a road junction or a road section, the RFID reader reads the preset RFID tag at the road junction or the road section. The processor 340 obtains the real-time location of the conveying robot 300, and optionally, transmits it to the data processing system 400. In other embodiments, the locating device 604 may also be a high-precision GPS positioning unit or a BeiDou positioning unit, which can also obtain the real-time location of the conveying robot 300.

The electronic compass 605 is preferably disposed inside or outside the car body 310 to obtain a real-time traveling direction of the conveying robot 300 and send it to the processor 340 for data processing and data analysis, so as to determine whether the real-time traveling direction of the conveying robot 300 is consistent with a preset direction. If the conveying robot 300 deviates from the preset direction, the processor 340 sends a control command to the car body 310 to adjust the traveling direction of the car body 310 in time.

Preferably, the image sensor 606 and/or the lighting device 607 are disposed at the front and/or rear end of the car body 310. The image sensor 606 is configured to collect real-time images and/or pictures of the front and/or rear end of the car body 310 in real time, and send them to the processor 340. When the conveying robot 300 travels in the aisle region 103 of the operation region 100, the image content including a passable travel region in the aisle region 103 at any time collected by the image sensor 606 is sent to the processor 340. The processor 340 calculates an expected travel region covered by the car body 310 in the next time period according to a real-time travel speed of the car body 310, and compares the expected travel region and the passable travel region at each time in real time, and then determines whether the car body 310 is still in the passable travel region in the next time period. If the expected travel region extends beyond the passable travel region, it proves that there are obstacles on the travel route of car body 310. The processor 340 needs to adjust the traveling direction of the car body 310 in real time to prevent the car body 310 from hitting the obstacles while traveling.

In other embodiments, the image content collected by the image sensor 606 may also include a frame of the solar panel and/or the panel array. The frame is shown as a straight line in the picture. In other embodiments, after processing by a specific algorithm, the conveying robot 300 may refer to the straight line of the frame to adjust the traveling direction in real time during the traveling process, so that the conveying robot 300 may travel in the straight line as much as possible.

When the conveying robot 300 is traveling in a dark environment (such as night, cloudy, etc.), the lighting device 607 is configured to illuminate the aisle region in front and/or rear end the car body 310, so that the image sensor 606 can collect images and or pictures normally. In some other embodiments, the image sensor 606 and/or the lighting device 607 may also be arranged on the left and/or right end of the car body 310 to collect real-time images and/or pictures on the left and/or right end of the car body 310 in real time. In some other embodiments, the image sensor 606 and/or the lighting device 607 may also be arranged on one side of the conveying device 320. A camera of the image sensor 606 faces the outside. When the height and tilt angle of the docking platform 321 are adjusted to be consistent with the solar panel 102, the camera is facing the solar panel 102.

The obstacle avoidance sensor 608, preferably an ultrasonic sensor, is disposed at the front and/or rear end of the car body 310. During the traveling process of the conveying robot 300, when the processor 340 obtains an induction signal from the obstacle avoidance sensor 608 disposed at the front or the rear end, it can determine whether there is an obstacle in the front or the rear end of the traveling route of the car body. Therefore, the processor 340 can adjust the traveling direction of the conveying robot 300 to avoid the obstacle. In other embodiments, the obstacle avoidance sensor 608 may also be disposed on the left and/or right end of the car body 310.

The present disclosure provides the conveying robot as a carrier tool for the cleaning robot. The conveying robot can transfer the cleaning robot in the aisle region between the plurality of solar panel arrays, so that the cleaning robot can complete the cleaning operations of different solar panel arrays. In this embodiment, the height and the tilt angle of the docking platform of the conveying robot can be adjusted.

Even if the height of the solar panel is large, the docking platform and the solar panel can be completely docked.

Figure 9:
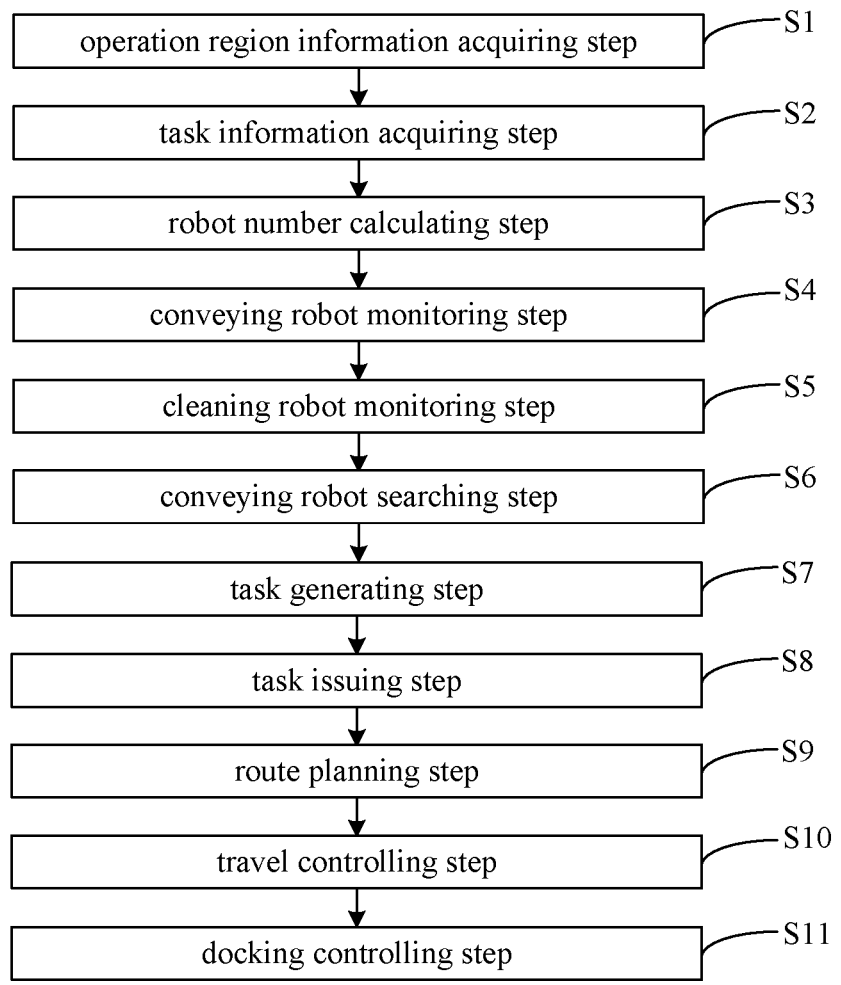
FIG. 9 is a flowchart of a robot scheduling method of an embodiment of the present disclosure.

As shown in FIG. 9, based on the aforementioned solar panel cleaning system, the present disclosure also provides a robot scheduling method, which includes the following steps S1 to S11.

In an operation region information acquiring step S1, operation region information is acquired. An operation region includes cleaning regions and aisle regions between two or more cleaning regions. The operation region information includes an operation region map, a location and a size of each cleaning region in the operation region.

In a task information acquiring step S2, operation task information is acquired. The operation task information includes a location, a size, and a workable time of the cleaning region that needs to be cleaned.

In a robot number calculating step S3, a number of cleaning robots and conveying robots that need to be scheduled is calculated. The robot number calculating step S3 includes a cleaning robot number calculating step and a conveying robot number calculating step.

Figure 10:
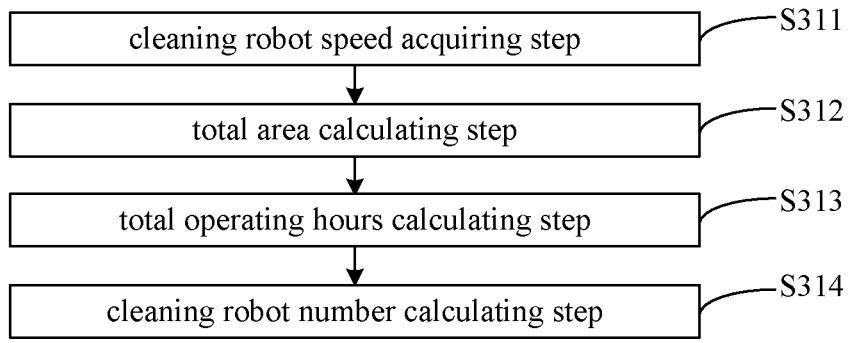
FIG. 10 is a flowchart of a cleaning robot number calculating step of the embodiment of the present disclosure.

As shown in FIG. 10, the cleaning robot number calculating step includes the following steps. In a cleaning robot speed acquiring step S311, a travel speed of each of the cleaning robots is acquired. In a total area calculating step S312, a total area that needs to be cleaned is calculated according to the size of the cleaning region that needs to be cleaned. In a total operating hours calculating step S313, total operating hours required for the cleaning robots to complete all cleaning tasks are calculated according to the total area of the cleaning region that needs to be cleaned and the travel speed of each of the cleaning robots. In a cleaning robot number calculating step S314, the number of the cleaning robots that need to be scheduled is calculated according to the total operating hours and the workable time.

Figure 11:
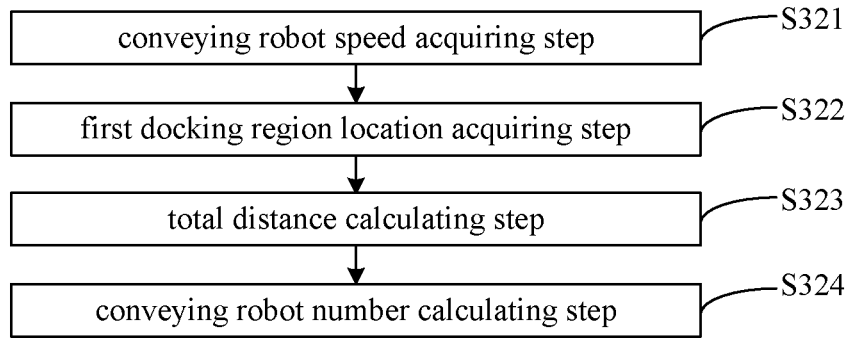
FIG. 11 is a flowchart of a conveying robot number calculating step of the embodiment of the present disclosure.

As shown in FIG. 11, the conveying robot number calculating step includes the following steps. In a conveying robot speed acquiring step S321, a travel speed of each of the conveying robots is acquired. In a first docking region location acquiring step S322, a location of a first docking region of the cleaning region that needs to be cleaned is acquired according to the operation region map and the location and the size of the cleaning region that needs to be cleaned. In a total distance calculating step S323, a total distance that all conveying robots need to travel is calculated according to initial storage locations of all conveying robots and the location of the first docking region of the cleaning region that needs to be cleaned. In a conveying robot number calculating step S324, the number of the conveying robots that need to be scheduled is calculated according to the total distance and the travel speed of each of the conveying robots.

Figure 12:
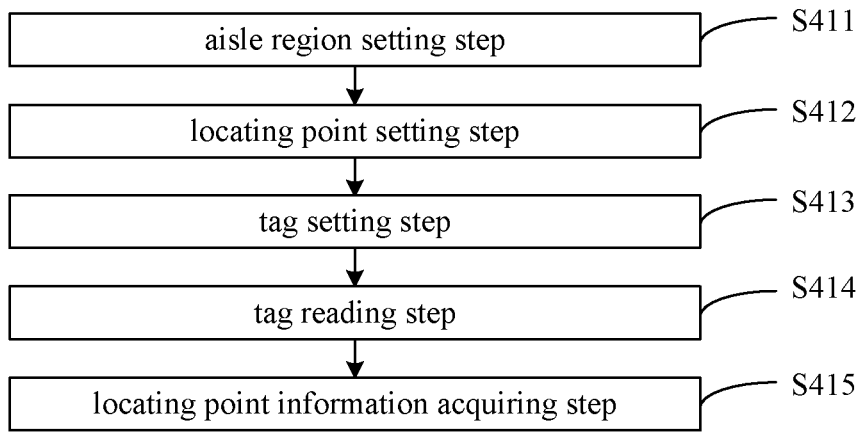
FIG. 12 is a flowchart of a part of a conveying robot monitoring step of the embodiment of the present disclosure.

In a conveying robot monitoring step S4, a location and a load status of each conveying robot are acquired in real time. The load status includes a fully loaded state and an unloaded state. As shown in FIG. 12, the step S4 includes the following steps S411 to S415. In an aisle region setting step S411, two or more aisle regions are set to form an aisle network for at least one robot to travel. In a locating point setting step S412, at least one locating point is evenly set in the aisle network. In a tag setting step S413, at least one readable tag is set at each locating point. The readable tag stores locating point information including a location and a serial number of the locating point where the readable tag is located. In a tag reading step S414, the locating point information of the readable tag is read and output by one conveying robot. In a locating point information acquiring step S415, the locating point information of the readable tag output by the conveying robot is acquired to obtain the location and the serial number of the locating point where the conveying robot is located.

In a cleaning robot monitoring step S5, a real-time operation progress of each cleaning robot is acquired in real time. As shown in FIG. 13, the step S5 further includes the following steps S521 to S523. In a sensor setting step S521, a weight sensor or a distance sensor is set on a conveying device of each conveying robot. In a sensor data reading step S522, a sensing data of the weight sensor or the distance sensor of one conveying robot is read. In a load status determining step S523, it is determined whether the conveying robot is loaded with the cleaning robot or not according to the sensing data of the weight sensor or the distance sensor. If so, the load status of the conveying robot is in the fully loaded state. If not, the load status of the conveying robot is in the unloaded state. The weight sensor can determine a weight value of the conveying device to determine whether there is the cleaning robot on the conveying device. The distance sensor is disposed on an inner wall of a middle of the conveying device rear baffle, and is opposite to the entrance. The distance sensor determines whether there is the cleaning robot on the conveying device according to a sensing state.

Figure 14:
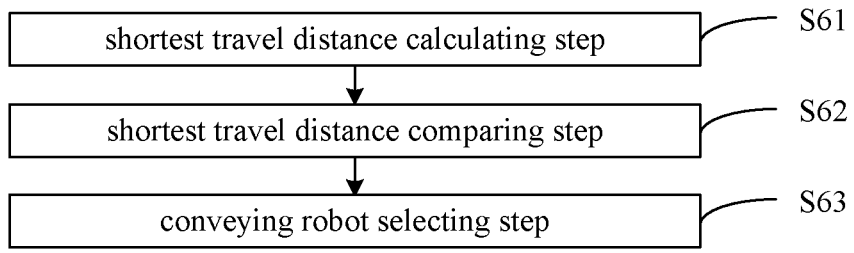
FIG. 14 is a flowchart of a conveying robot searching step of the embodiment of the present disclosure.

In a conveying robot searching step S6, one conveying robot that is closest to the first docking region of the cleaning region and is in the unloaded state is searched for when an operation progress of one cleaning robot in one cleaning region exceeds a preset threshold. As shown in FIG. 14, the conveying robot searching step S6 includes the following steps. In a shortest travel distance calculating step S61, a shortest travel distance between each conveying robot in the unloaded state and the first docking region of the cleaning region is calculated. In a shortest travel distance comparing step S62, the shortest travel distance of each conveying robot in the unloaded state and the first docking region of the cleaning region is compared. In a conveying robot selecting step S63, the conveying robot with the smallest shortest travel distance and in the unloaded state is selected. The shortest travel distance is a distance corresponding to the shortest route of the conveying robot traveling in the aisle region to the first docking region of the cleaning region.

In a task generating step S7, a conveying task instruction is generated. The conveying task instruction includes starting point information, stop-by point information, and/or terminal point information. The starting point information includes a location of a starting point in a conveying task. When one conveying robot acquires the conveying task instruction, a real-time location of the conveying robot is set to be the starting point. The stop-by point information includes a position of a stop-by point in the conveying task. When the cleaning robot is located in a storage region, the stop-by point is located in the storage region. When the cleaning robot is located on an upper surface of one cleaning region where the cleaning operations have been performed, the stop-by point is located in a first docking region of the cleaning region. The terminal point information includes a position of a terminal point in the conveying task. The terminal point is located in a first docking region of a cleaning region that needs to be cleaned.

In a task issuing step S8, the conveying task instruction is issued to the conveying robot.

Figure 15:
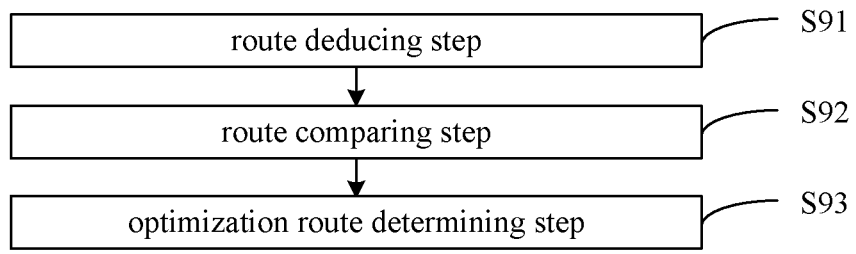
FIG. 15 is a flowchart of a route planning step of the embodiment of the present disclosure.

In a route planning step S9, an optimization route of the conveying robot is planned. As shown in FIG. 15, the route planning step includes the following steps. In a route deducing step S91, at least one passable route in at least one aisle region is deduced according to the positions of the starting point and the terminal point. The passable route passes through the stop-by point. In a route comparing step S92, lengths of passable routes are compared when there are two or more passable routes. In an optimization route determining step S93, the passable route is determined as the optimization route if there is only one passable route, or a shortest passable route is determined as the optimization route if there are two or more passable routes.

In a travel controlling step S10, the conveying robot is controlled to travel along the optimization route. In this embodiment, a navigation technology is used to obtain the position of the conveying robot in real time to monitor that the conveying robot travels along the optimization route (also called a recommended route) to a preset terminal point. The label positioning solution described in the foregoing of this embodiment can realize the label positioning navigation to monitor in real time whether the conveying robot deviates from the preset optimization route. If there is a deviation, a correction instruction is issued in time and an actual traveling direction of the conveying robot is adjusted in time.

In a docking controlling step S11, the conveying robot is controlled to dock with the cleaning region.

Figure 16:
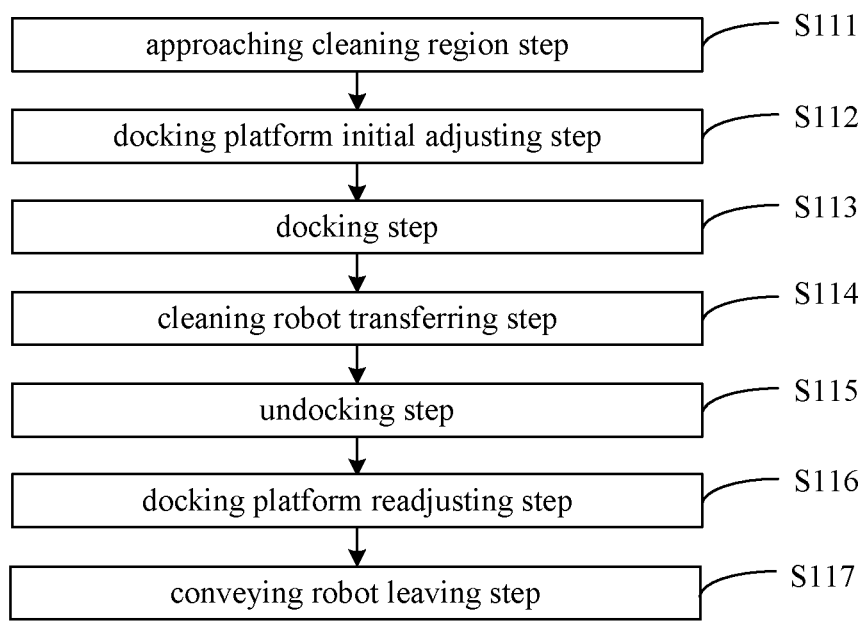
FIG. 16 is a flowchart of a docking controlling step of the embodiment of the present disclosure.

As shown in FIG. 16, the docking controlling step includes the following steps. In an approaching cleaning region step S111, the conveying robot is controlled to travel to a first docking region of one cleaning region. The conveying robot includes a docking platform and a bridge board. In a docking platform initial adjusting step S112, the conveying robot is controlled to adjust a height and/or an angle of the docking platform, so that an upper surface of the docking platform is flush with an upper surface of the cleaning region. The entrance of the conveying device faces a second docking region. In a docking step S113, the conveying robot is controlled to extend the bridge board to dock with the upper surface of the docking platform with the upper surface of the cleaning region. In a cleaning robot transferring step S114, the cleaning robot is controlled to travel from the docking platform to the upper surface of the cleaning region, or from the cleaning region to the upper surface of the docking platform of the cleaning region.

Furthermore, the docking controlling step further includes the following steps. In an undocking step S115, the conveying robot is controlled to retract the bridge board, so that the upper surface of the docking platform is separated from the upper surface of the cleaning region. In a docking platform readjusting step S116, the conveying robot is controlled to adjust the height and/or the angle of the docking platform, so that the docking platform is moved to a lowest point and keeps in a horizontal level. In a conveying robot leaving step S117, the conveying robot is controlled to leave the cleaning region.

The present disclosure provides the robot scheduling method for the solar panel cleaning system. According to the workload of cleaning operations, an appropriate number of cleaning robots and conveying robots is scheduled. The cleaning robot completes the cleaning operations on the solar panel or the solar panel array. The conveying robot transfers the cleaning robot between the plurality of solar panel arrays. Therefore, all cleaning tasks of the solar panels and the panel arrays can be completed in the shortest time.

The present disclosure has been described by the above related embodiments. However, the above-mentioned embodiments are only examples for implementing the present disclosure. It must be pointed out that the disclosed embodiments do not limit the scope of the present disclosure. On the contrary, the modifications and equivalent settings included in the spirit and scope of the claims are all included in the scope of the present disclosure.

The main body of the present disclosure can be manufactured and used in industry and has industrial applicability.

What is claimed is:

1. A robot scheduling method, wherein robots in the robot scheduling method comprises:
    a cleaning robot configured to perform cleaning operations in a cleaning region; and
    a conveying robot configured to transport the cleaning robot in an aisle region, wherein the conveying robot comprises a docking platform and a bridge board; and
    wherein the robot scheduling method comprises following steps:
        a task generating step for generating a conveying task instruction;
        a task issuing step for issuing the conveying task instruction to the conveying robot;
        a route planning step for planning an optimization route of the conveying robot;
        a travel controlling step for controlling the conveying robot to travel along the optimization route; and
        a docking controlling step for controlling the conveying robot to dock with the cleaning region,
    wherein the docking controlling step for controlling the conveying robot to dock with the cleaning region comprises following steps:
        an approaching cleaning region step for controlling the conveying robot to travel to a first docking region of one cleaning region;
        a docking platform initial adjusting step for controlling the conveying robot to adjust a height and/or an angle of the docking platform, so that an upper surface of the docking platform is flush with an upper surface of the cleaning region, wherein an entrance of a conveying device faces a second docking region;
        a docking step for controlling the conveying robot to extend the bridge board to dock the upper surface of the docking platform with the upper surface of the cleaning region;
        a cleaning robot transferring step for controlling the cleaning robot to travel from the docking platform to the upper surface of the cleaning region, or from the cleaning region to the upper surface of the docking platform;
        an undocking step for controlling the conveying robot to retract the bridge board so that the upper surface of the docking platform is separated from the upper surface of the cleaning region;
        a docking platform readjusting step for controlling the conveying robot to adjust the height and/or the angle of the docking platform, so that the docking platform is moved to a lowest point and keeps in a horizontal level; and
        a conveying robot leaving step for controlling the conveying robot to leave the cleaning region.

2. The robot scheduling method according to claim 1, wherein before performing the task generating step, the method further comprises following steps:
    an operation region information acquiring step for acquiring operation region information, wherein an operation region comprises a plurality of cleaning regions and the aisle region between two or more cleaning regions, the operation region information comprises an operation region map and a location and a size of each of the cleaning regions in the operation region;

a task information acquiring step for acquiring operation task information, wherein the operation task information comprises a location, a size, and a workable time of the cleaning region that needs to be cleaned; and a robot number calculating step for calculating a number of cleaning robots and conveying robots that need to be scheduled.

3. The robot scheduling method according to claim 2, wherein the robot number calculating step comprises following steps:

a cleaning robot speed acquiring step for acquiring a travel speed of each of the cleaning robots;

a total area calculating step for calculating a total area that needs to be cleaned according to the size of the cleaning region that needs to be cleaned;

a total operating hours calculating step for calculating total operating hours required for the cleaning robots to complete all cleaning tasks according to the total area of the cleaning region that needs to be cleaned and the travel speed of each of the cleaning robots; and a cleaning robot number calculating step for calculating the number of the cleaning robots that need to be scheduled according to the total operating hours and the workable time.

4. The robot scheduling method according to claim 2, wherein the robot number calculating step comprises following steps:

a conveying robot speed acquiring step for acquiring a travel speed of each of the conveying robots;

a first docking region location acquiring step for acquiring a location of a first docking region of the cleaning region that needs to be cleaned according to the operation region map and the location and the size of the cleaning region that needs to be cleaned;

a total distance calculating step for calculating a total distance that all conveying robots need to travel according to initial storage locations of all conveying robots and the location of the first docking region of the cleaning region that needs to be cleaned; and a conveying robot number calculating step for calculating the number of the conveying robots that need to be scheduled according to the total distance and the travel speed of each of the conveying robots.

5. The robot scheduling method according to claim 1, wherein the cleaning region is a solar panel or a solar panel array; and/or wherein the cleaning region comprises:

the first docking region which is a region outside the cleaning region and adjacent to one side of the cleaning region; and the second docking region which is a region inside the cleaning region and adjacent to one side of the cleaning region, and is opposite to the first docking region.

6. The robot scheduling method according to claim 1, wherein before performing the task generating step, the method further comprises following steps:

a conveying robot monitoring step for acquiring a location and a load status of each conveying robot in real time, wherein the load status comprises a fully loaded state and an unloaded state;

a cleaning robot monitoring step for acquiring a real-time operation progress of each cleaning robot in real time; and a conveying robot searching step for searching for one conveying robot that is closest to the first docking region of the cleaning region and is in the unloaded state when an operation progress of one cleaning robot in one cleaning region exceeds a preset threshold.

7. The robot scheduling method according to claim 6, wherein the conveying robot monitoring step comprises following steps:

an aisle region setting step for setting two or more aisle regions to form an aisle network for at least one robot to travel;

a locating point setting step for evenly setting at least one locating point in the aisle network;

a tag setting step for setting at least one readable tag at each locating point, wherein the readable tag stores locating point information comprising a location and a serial number of the locating point where the readable tag is located;

a tag reading step for reading and outputting the locating point information of the readable tag by one conveying robot; and a locating point information acquiring step for acquiring the locating point information of the readable tag output by the conveying robot to obtain the location and the serial number of the locating point where the conveying robot is located.

8. The robot scheduling method according to claim 6, wherein the cleaning robot monitoring step comprises following steps:

a sensor setting step for setting a weight sensor or a distance sensor on the conveying device of each conveying robot;

a sensor data reading step for reading a sensing data of the weight sensor or the distance sensor of one conveying robot; and a load status determining step for determining whether the conveying robot is loaded with the cleaning robot or not according to the sensing data of the weight sensor or the distance sensor, wherein if so, the load status of the conveying robot is in the fully loaded state; if not, the load status of the conveying robot is in the unloaded state.

9. The robot scheduling method according to claim 6, wherein the conveying robot searching step comprises following steps:

a shortest travel distance calculating step for calculating a shortest travel distance between each conveying robot in the unloaded state and the first docking region of the cleaning region;

a shortest travel distance comparing step for comparing the shortest travel distance of each conveying robot in the unloaded state and the first docking region of the cleaning region; and a conveying robot selecting step for selecting the conveying robot with a smallest shortest travel distance and in the unloaded state, wherein the shortest travel distance is a distance corresponding to a shortest route of the conveying robot traveling in the aisle region to the first docking region of the cleaning region.

10. The robot scheduling method according to claim 1, wherein the conveying task instruction comprises:

starting point information comprising a location of a starting point in a conveying task, wherein when one conveying robot acquires the conveying task instruction, a real-time location of the conveying robot is set to be the starting point;

stop-by point information comprising a position of a stop-by point in the conveying task, wherein when the cleaning robot is located in a storage region, the stop-by point is located in the storage region; and when the cleaning robot is located on an upper surface of one cleaning region where the cleaning operations have been performed, the stop-by point is located in a first docking region of the cleaning region; and terminal point information comprising a position of a terminal point in the conveying task, wherein the terminal point is located in a first docking region of a cleaning region that needs to be cleaned.

11. The robot scheduling method according to claim 10, wherein the route planning step comprises:

a route deducing step for deducing at least one passable route in at least one aisle region according to the positions of the starting point and the terminal point, wherein the passable route passes through the stop-by point;

a route comparing step for comparing lengths of passable routes when there are two or more passable routes; and an optimization route determining step for determining the passable route as the optimization route if there is only one passable route, or for determining a shortest passable route as the optimization route if there are two or more passable routes.

* * * * *